(12) United States Patent
Gotou

(10) Patent No.: US 6,880,667 B2
(45) Date of Patent: Apr. 19, 2005

(54) IMPACT ABSORBING STRUCTURE FOR VEHICLE BODY AND RELATED METHOD

(75) Inventor: Hiromitsu Gotou, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 107 days.

(21) Appl. No.: 10/340,732

(22) Filed: Jan. 13, 2003

(65) Prior Publication Data

US 2003/0136601 A1 Jul. 24, 2003

(30) Foreign Application Priority Data

Jan. 23, 2002 (JP) .................................. P2002-014260

(51) Int. Cl.⁷ .................................................. B60K 1/00
(52) U.S. Cl. .................. 180/291; 280/784; 296/187.03
(58) Field of Search ............................... 180/291, 312, 180/299, 300; 280/784; 296/187.03, 35.2; 248/634, 635, 638, 674

(56) References Cited

U.S. PATENT DOCUMENTS

| | | | | |
|---|---|---|---|---|
| 2,308,962 A | * | 1/1943 | Riesing ...................... 248/605 |
| 3,702,178 A | * | 11/1972 | Schultz .................... 267/140.3 |
| 4,406,343 A | | 9/1983 | Harasaki |
| 5,037,058 A | * | 8/1991 | Kojima et al. .............. 248/562 |
| 5,267,630 A | * | 12/1993 | Watanabe et al. ........... 180/297 |
| 5,435,516 A | * | 7/1995 | Ogasawara et al. ......... 248/635 |
| 5,472,063 A | | 12/1995 | Watanabe et al. |
| 5,718,407 A | * | 2/1998 | Lee ............................. 248/634 |
| 6,203,098 B1 | * | 3/2001 | Motozawa et al. .... 296/187.09 |
| 6,494,286 B1 | * | 12/2002 | Shimizu et al. ............. 180/299 |
| 6,708,793 B1 | * | 3/2004 | Witherspoon et al. ...... 180/291 |
| 6,729,430 B1 | * | 5/2004 | Adams et al. .............. 180/300 |

FOREIGN PATENT DOCUMENTS

| | | |
|---|---|---|
| JP | 2000-168624 | 6/2000 |
| JP | 2001-278116 | 10/2001 |
| JP | 2002-2310 | 1/2002 |
| JP | 2002-12040 | 1/2002 |

* cited by examiner

Primary Examiner—Christopher P. Ellis
Assistant Examiner—Christopher Bottorff
(74) Attorney, Agent, or Firm—McDermott Will & Emery LLP

(57) ABSTRACT

An impact absorbing structure for a vehicle body is provided with a pair of front side members extending in a longitudinal direction of a vehicle body, at vicinities of both ends of the vehicle body in a widthwise direction of the vehicle body, an engine room defined between the pair of front side members to allow an engine unit to be located therein, and a pair of engine attaching portions each of which is disposed on corresponding one of the pair of front side members, at an area facing the engine room. Each of the pair of engine attaching portions includes an engine mount to which the engine unit is connected, an engine mount bracket connected to the engine mount, and an engine mount bracket support intervened between the engine mount bracket and corresponding one of the pair of front side members to support the engine mount bracket.

8 Claims, 5 Drawing Sheets

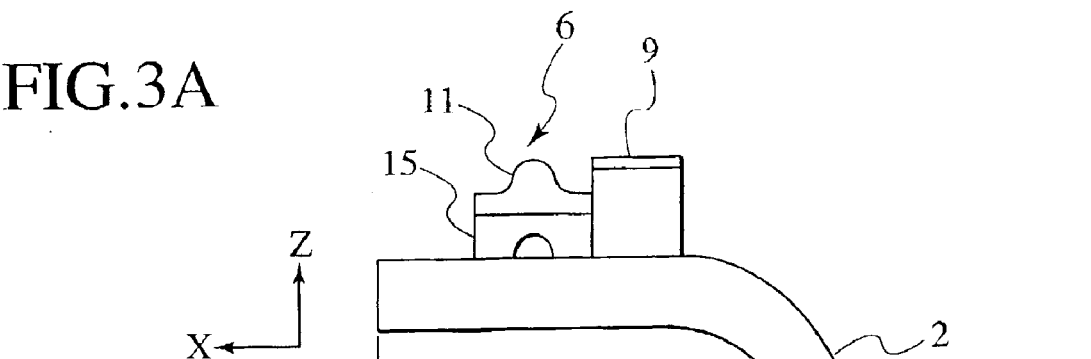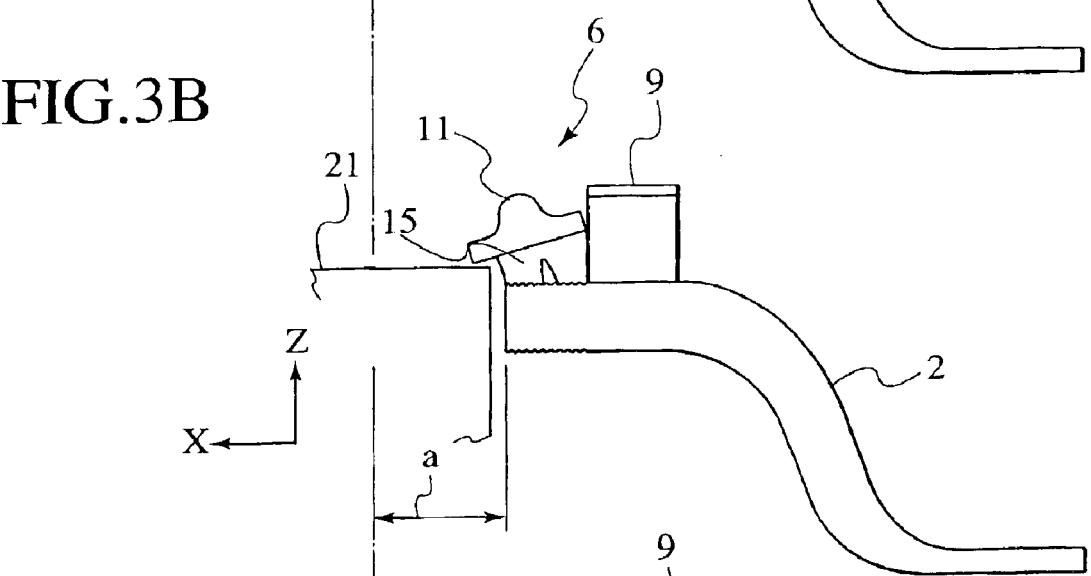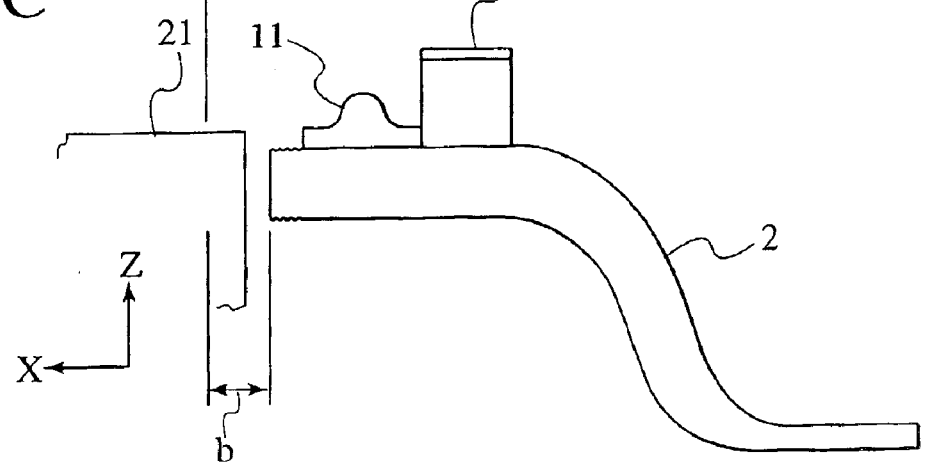

IMPACT ABSORBING STRUCTURE FOR VEHICLE BODY AND RELATED METHOD

BACKGROUND OF THE INVENTION

The present invention relates to an impact absorbing structure for a vehicle body and a related method, and, more particularly, to an impact absorbing structure for an engine attaching structure of a vehicle body and its related method.

An approach is made to provide an attaching structure, by which an engine is mounted to a vehicle body, that includes a total of three mount sites, i.e., right and left mount sites located on a pair of front side members, extending at right and left sides of the vehicle body along a fore and aft direction thereof, at front areas thereof to permit the engine to be mounted via engine mounts, and a lower mount site disposed on a sub frame lying below the vehicle body to permit the engine to be mounted thereon via an engine mount.

Such an attaching structure employing the total of three mount sites is particularly shown in FIG. 5 in a schematic perspective view. In the figure, directional terms X-, Y- and Z-directions refer to a longitudinal direction of the vehicle body, a leftward direction in a widthwise direction of the vehicle body and an upward direction of the vehicle body. Also, in the following description of the attaching structure, a typical right side structure of the vehicle body is mainly described for convenience in referring to the figures.

In FIG. 5, an engine mount bracket 11 is mounted on a front side member 2 that extends at the right side of the vehicle along the fore and aft direction thereof, and an engine mount 10 is fixed to the engine mount bracket 11. An engine, not shown, is coupled to the engine mount 10 to be mounted in an engine room 5.

Japanese Patent Application Laid-Open Publication No. 2001-278116 or Japanese Patent Application Laid-Open Publication No. 2000-168624 discloses a attaching structure in which an engine is mounted in a vehicle body using a sum of three mount sites lying in right, left and lower areas.

SUMMARY OF THE INVENTION

However, upon considerable studies undertaken by the present inventor, an approach may be conceived in that the attaching structure for permitting the engine to be mounted in the vehicle body has the following structure.

First, since the engine mount bracket 11, which is provided with a high strength and rigidity with a view to improving a vibration absorbing performance of the engine, is directly secured to the front side member 2, (1) while the front side member 2 is desired to have an impact absorbing function to allow the front side member 2 to be collapsed to absorb an impact load exerted from a front of the vehicle body during a frontal impact collision whereas the engine mount bracket 11 having the high strength and rigidity is directly secured to the front side member 2, a kind of reinforcing effect is created in the front side member 2 due to the engine mount bracket 11 to cause the front side member 2 to encounter a difficulty in collapsing at a fixing area of the engine mount bracket 11 to cause the front side member 2 to have a poor impact absorbing efficiency, and (2) while, owing to a demand for improving the impact absorbing efficiency and constructing a layout of the engine room 5 to avoid interference between the engine and other components parts when the front side member 2 is deformed during the impact absorbing operation, it is desirable to control a mode in or a timing at which the front side member 2 is deformed during the impact absorbing operation whereas the fixing area of the engine mount bracket 11 is hard to be determined at an arbitrary strength and rigidity, it becomes hard to ensure the freedom in design for the mode in and the timing at which the front side member 2 is deformed during the impact absorbing operation.

Secondly, since the right and left mount sites are formed in structures in compliance with the pair of the front side members displaced from one another in the widthwise direction of the vehicle body, a vertical distance between the lower mount site and a line interconnecting the right and left mount sites becomes short resulting in a need for additionally providing a reinforcement material in order to increase the strength and rigidity of the mounts with respect to a roll in a lateral direction of the engine about an axis extending along the fore and aft direction of the vehicle body or a roll in a fore and aft direction of the engine about an axis extending in the widthwise direction of the vehicle body, or resulting in a need for additionally providing a noise insulation material or a noise absorbing material in order to avoid vibrations or an internally accumulated noise of the engine occurring due to the lowered roll rigidity, leading, in any cases, to an increase in the number of steps in assembling work and in production costs.

The present invention has been completed upon the above considerable studies undertaken by the present inventor and has an object to provide an impact absorbing structure for a vehicle body and a related method and, more particularly, to an impact absorbing structure for an engine attaching structure of a vehicle body and its related method which provide increased impact absorbing efficiencies of front side members and also increased freedom of design for fixing areas of engine mount brackets with no need for or with a minimized use of reinforcement materials required for right and left mount sites of a vehicle body, noise insulation materials or noise absorbing materials.

In order to achieve the above object, the present invention provides an impact absorbing structure for a vehicle body, comprising: a pair of front side members extending in a longitudinal direction of a vehicle body, at vicinities of both ends of the vehicle body in a widthwise direction of the vehicle body; an engine room defined between the pair of front side members to allow an engine unit to be located therein; and a pair of engine attaching portions each of which is disposed on corresponding one of the pair of front side members, at an area facing the engine room, each of the pair of engine attaching portions including an engine mount to which the engine unit is connected, an engine mount bracket connected to the engine mount, and an engine mount bracket support intervened between the engine mount bracket and corresponding one of the pair of front side members to support the engine mount bracket.

Stated another way, the present invention provides an impact absorbing structure for a vehicle body, comprising: a pair of front side members extending in a longitudinal direction of a vehicle body, at vicinities of both ends of the vehicle body in a widthwise direction of the vehicle body; an engine room defined between the pair of front side members to allow an engine unit to be located therein; and a pair of engine attaching means for attaching the engine unit, each of the engine attaching means being disposed on corresponding one of the pair of front side members, at an area facing the engine room, and each of the engine attaching means including mounting means for mounting the engine unit and supporting means for supporting the mounting means, the supporting means being intervened between the supporting means and corresponding one of the pair of front side members.

On the other hand, the present invention provides a method of absorbing an impact exerted to a vehicle body, which has a pair of front side members extending in a longitudinal direction of a vehicle body, at vicinities of both ends of the vehicle body in a widthwise direction of the vehicle body, and an engine room defined between the pair of front side members to allow an engine unit to be located therein, the method comprising: providing a pair of engine attaching portions each of which is disposed on corresponding one of the pair of front side members, at an area facing the engine room, each of the pair of engine attaching portions including an engine mount to which the engine unit is connected, an engine mount bracket connected to the engine mount, and an engine mount bracket support intervened between the engine mount bracket and corresponding one of the pair of front side members to support the engine mount bracket; applying a load to at least one of the pair of front side members; permitting the at least one of the pair of front side members to be collapsed and deformed in dependence on the load; and continuously permitting the at least one of the pair of front side members and the engine mount bracket support corresponding to the at least one of the pair of engine attaching portions to be collapsed and deformed in dependence on the load.

Other and further features, advantages, and benefits of the present invention will become more apparent from the following description taken in conjunction with the following drawings.

BRIEF DESCRIPTION OF THE DRAWINGS

FIG. 3A is a side view illustrating a front side member and an engine attaching portion of the engine attaching structure under a condition where no impact load is exerted in the embodiment;

FIG. 3B is a side view illustrating how an impact is absorbed in the engine attaching structure of the embodiment;

FIG. 3C is a side view illustrating how an impact is absorbed in an engine attaching structure of a comparative example;

DETAILED DESCRIPTION OF THE PREFERRED EMBODIMENT

An impact absorbing structure for a vehicle body of an embodiment according to the present invention and a related method and, more particularly, an impact absorbing structure for an engine attaching structure of a vehicle body and its related method are described below with reference to FIGS. 1 to 4B. In the following description of the impact absorbing structure, directional terms, such as "X-direction", "Y-direction" and "Z-direction" to indicate a longitudinal direction of the vehicle body B, a leftward direction in a widthwise direction of the vehicle body and an upper direction of the vehicle body, are used for convenience in referring to the accompanying drawings.

Figure 1:
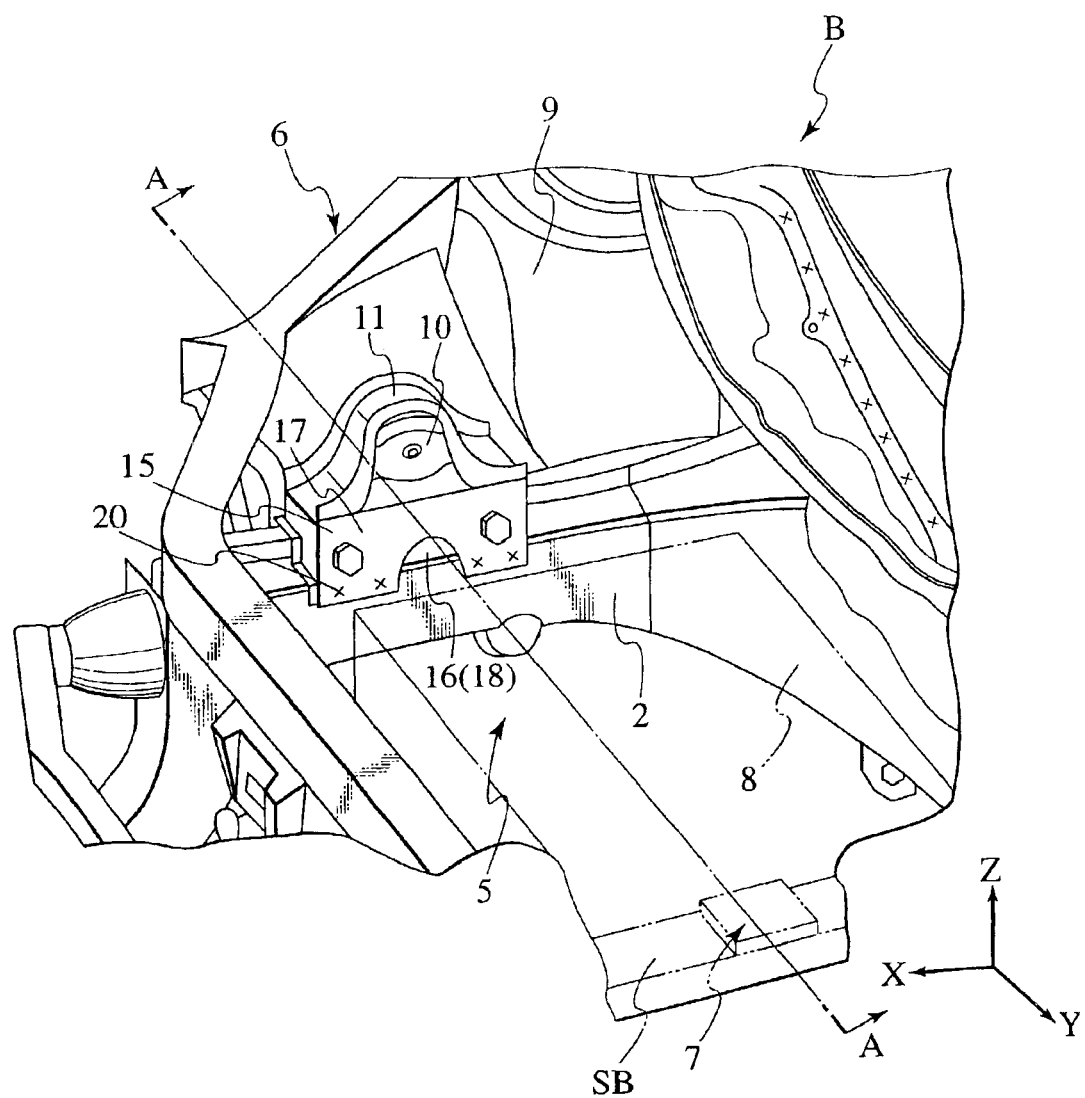
FIG. 1 is a schematic partial perspective view of an impact absorbing structure for an engine attaching structure of an embodiment according to the present invention.
Figure 2:
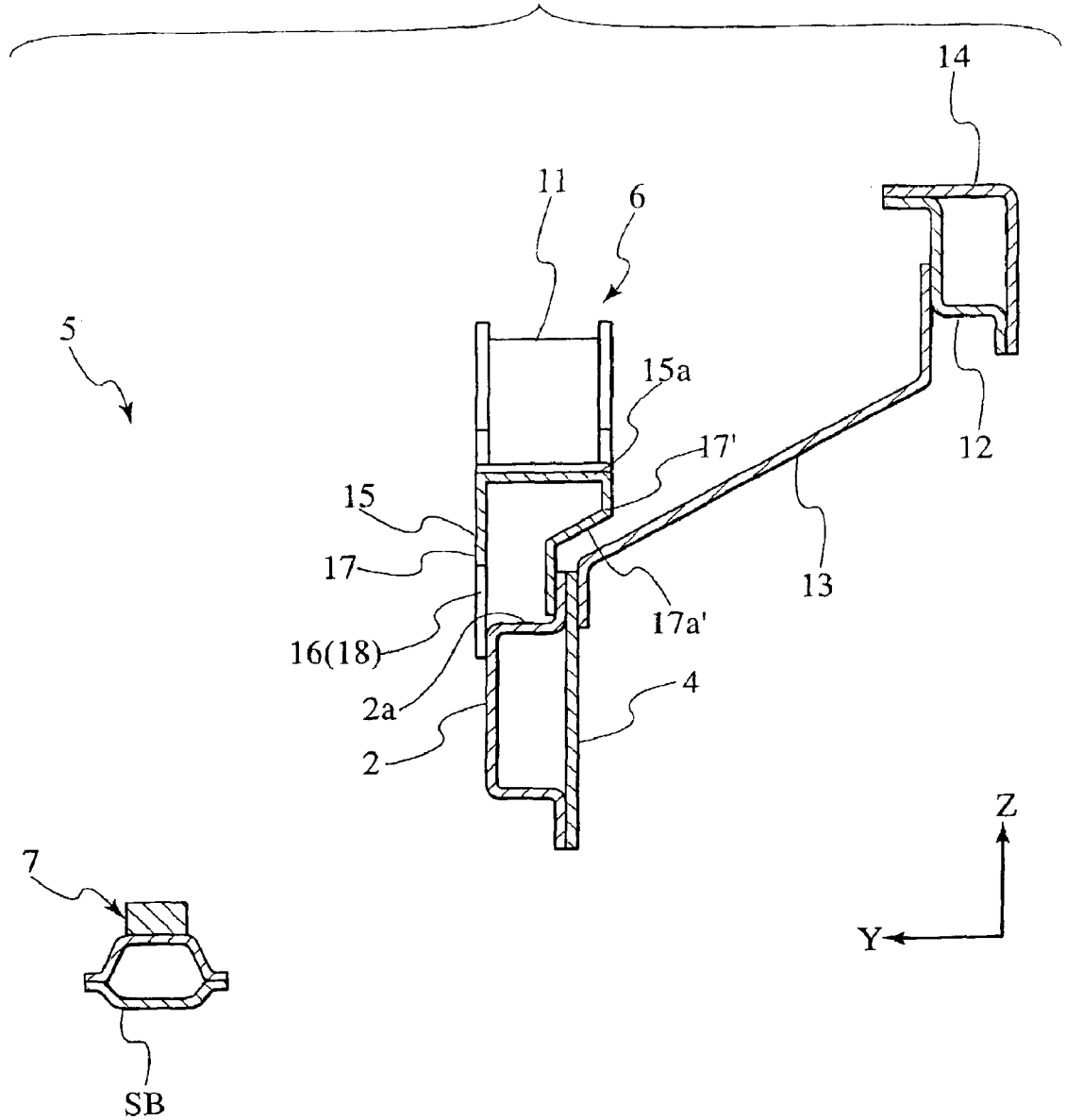
FIG. 2 is a schematic cross sectional view taken on line A—A of FIG. 1.

FIG. 1 is a schematic partial perspective view of the impact absorbing structure for the engine attaching structure of the vehicle body of the presently filed embodiment, and FIG. 2 is a schematic cross sectional view taken on line A—A of FIG. 1.

As shown in FIGS. 1 and 2, a front portion of the vehicle body B is provided with a pair of front side members 2, 2 which longitudinally extend along a fore and aft direction of the vehicle body B at the vicinities of both ends of the vehicle body B in the widthwise direction thereof. Also, while a representative right side structure of the vehicle body is mainly shown in the figure for convenience of illustration and the following description is given mainly in relation to the front side member 2 on the right side of the vehicle body, it is to be noted that the left side structure of the front side member 2 is also formed in a similar structure.

The front side member 2 takes the form of a substantially hat shaped cross sectional structure, which is opened outward in the widthwise direction of the vehicle body, with a closing plate 4 being firmly fixed to an opened portion of the front side member 2 to close the same so as to provide a closed cavity. Further, the present invention is not limited to a particular direction in which the front side member 2 is opened, and the front side member 2 may be located in a reversed direction to cause the opened portion to be directed inward in the widthwise direction of the vehicle body.

Further, a right engine attaching portion 6 is provided on the front side member 2 in an area facing to an engine room 5 to permit an engine unit 8 to be mounted in the vehicle body B. While only one right engine attaching portion 6 is shown as provided, it is to be noted that the left front side member also similarly carries a left engine attaching portion.

On the other hand, a sub frame SB, which extends in the fore and aft direction of the vehicle body, is firmly fixed to the vehicle body B at a lower position than the front side member 2 as will be described in detail hereinafter. A lower engine attaching portion 7 is disposed on the sub frame SB for permitting the engine unit 8 to be mounted. Also, the present invention is not limited to a particular structure of the sub frame SB and may be comprised of either a single member or a combination of plural members. Further, the sub frame may be comprised of an elongated member that does not extend in the fore and aft direction but extends in the widthwise direction or may be comprised of elongated members that are bifurcated in right and left directions with respect to the fore and aft direction of the vehicle body.

The engine attaching portion 6 includes an engine mount 10, which is directly connected to and supports the engine unit 8 and is internally provided with resilient material such as rubber that serves a mount insulator to bear a load of the engine unit 8 while absorbing vibrations, and an engine mount bracket 11 connected to the engine mount 10 to support the same.

Further, provided in a rear area of the engine attaching portion 6 is a strut tower housing 9.

Furthermore, the engine room 5 is surrounded with the front side member 2, and additionally with vehicle structural members, such as a hood ridge upper member 12, a hood ridge lower member 13 and a hood ridge reinforcement member 14, with the hood ridge upper member 12 and the hood ridge reinforcement member 14 being coupled to one another to form a closed cavity that extends in the fore and aft direction of the vehicle body. The hood ridge lower member 13 has a lower end fixedly secured to the front side member 2 via the closing plate 4 and an upper end fixedly secured to the hood ridge upper member 12.

Moreover, an engine mount bracket support 15 is fixedly secured to the front side member 2 to allow the engine mount bracket 11 to be fixedly connected to the front side member 2 via the engine mount bracket support 15.

In particular, with the engine attaching portion 6, the engine mount bracket support 15 is fixed to the front side member 2 by means of a plurality of spot-welded portions 20. It is to be noted here that the present invention is not limited to such a particular spot welding technique and may take any other suitable connecting techniques, such as welding methods of other types, and other coupling methods using bolts and nuts provided that a similar coupling strength is obtained.

The engine mount bracket support 15 is fixedly secured to a top surface 2a of the front side member 2, and the engine mount bracket 11 is fixedly secured to a top of the engine mount bracket support 15. To this end, the engine mount bracket support 15 has a top wall 15a, an inwardly facing vertical wall 17 extending in the longitudinal direction of the vehicle body, and an outwardly facing vertical wall 17' extending in the longitudinal direction of the vehicle body, with the inner vertical wall 17 and the outer vertical wall 17' closing the engine mount bracket support 15 with respect to the widthwise direction of the vehicle body. Further, the top wall 15a, the inner vertical wall 17 and the outer vertical wall 17' form a substantially hat-shaped cross sectional structure that opens downward of the vehicle body, and they form a closed cavity with the top surface 2a of the front side member 2. Furthermore, the outer vertical wall 17' has a concave portion 17'a, which is inwardly displaced from the hood ridge lower member 13 to avoid an interference therewith.

Further, the engine mount bracket support 15 is formed with a strength weakened portion 16 that provides a lower longitudinal strength in the engine mount bracket support 15 than that of the engine mount bracket 11 to permit the engine mount bracket 15 to have a longitudinal strength substantially equal to a longitudinal strength of the front side member 2 at an area close proximity to a position at which the engine mount bracket support 15 is mounted. Of course, depending on situations, the longitudinal strength of the engine mount bracket support 15 may be determined to be lower than the longitudinal strength of the front side member 2 in the area close proximity to the position at which the engine mount bracket support 15 is mounted.

The strength weakened portion 16 takes the form of a cutout portion 18 that is formed on the inner vertical wall 17 of the engine mount bracket support 15. Of course, depending on situations, the cutout portion 18 may be formed on the outer vertical wall 17', or the cutout portions 18 may be formed on both the inner and outer vertical walls 17, 17' in a single or in plural configurations. Also, the strength weakened portion 16 may not necessarily include the cutout configuration and may take the form of a thinned wall portion formed with a reduced thickness portion of the engine mount bracket support 15.

With such a structure set forth above, firmly fixing the engine mount bracket support 15 to the front side member 2 to form a structure such that the engine mount bracket support 11 is fixedly secured to the front side member 12 via the engine mount bracket support 15 permits the engine mount bracket, which has a high strength and rigidity, to be fixedly secured to the front side member 2 in a so-called indirect fashion.

Now, operation of the structure of the presently filed embodiment discussed above is described with reference to FIGS. 3A to 3C.

FIG. 3A is a side view of the front side member and the engine attaching portion mainly forming the impact absorbing structure for the engine attaching structure of the presently filed embodiment under a condition where an impact load is not exerted. FIG. 3B is a side view illustrating how the impact load is absorbed in such an impact absorbing structure, and FIG. 3C is a side view illustrating how the impact load is absorbed in a structure of a comparative structure. These side views typically illustrate the right side structures of the vehicle body, and FIGS. 3B and 3C show barrier members 21 for permitting the impact loads to be exerted.

First, as shown in FIG. 3A, the engine mount bracket 11 is indirectly fixed to the front side member 2 via the engine mount bracket support 15.

Next as shown in FIG. 3B, the barrier member 21 is moved rearward from a forward area of the vehicle body at a given speed into a collision with the front side member 2. As long as the impact load remains continued, the barrier member 21 is moved further rearward, while causing the front side member 2 to be collapsed into abutting engagement with the engine mount bracket support 15. When this occurs, since the engine mount bracket support 15 is formed with the strength weakened portion 16 that provides the lower longitudinal strength in the engine mount bracket support than that of the engine mount bracket 11 and that has the strength substantially equal to that of the front side member 2 in the vicinity of the position at which the engine mount bracket support 15 is mounted, the front side member 2 and the fixing area of the engine mount bracket 11 with respect to the front side member 2 are collapsed together, resulting in a capability of reliably absorbing the impact energy. In this respect, it is supposed here that the front side member 2 is collapsed in a stroke "a".

On the contrary, in a case where as shown in FIG. 3C, the comparative structure has the engine mount bracket 11 directly secured to the front side member 2, a fixing area of the front side member 2 between the engine mount bracket 11 and the front side member 2 as well as an area rearward of the fixing area can not be collapsed during a frontal collision. Supposing that the front side member 2 is collapsed in a stroke "b", it is understood that the collapsible stroke "a" shown in FIG. 3B becomes greater than the collapsible stroke "b".

With the structure set forth above, structuring the impact absorbing structure such that the engine mount bracket support 15 is firmly fixed to the front side member 2 to allow the engine mount bracket 11 to be secured to the front side member 2 via the engine mount bracket support 15 enables the engine mount bracket 11, which has a high strength and rigidity, to be indirectly fixed to the front side member 2.

Accordingly, suitable adjustments of the strength and rigidity of the engine mount bracket support 15 at lowered values enable the strength and rigidity of the fixing area of the front side member 2, at which the engine attaching portion 6 is firmly secured, to be appropriately lowered during absorption of the impact energy regardless of the high strength and rigidity of the engine mount bracket 15, with a resultant improvement in an impact absorbing efficiency of the front side member 2.

It is to be noted here that modification of the structure of the fixing area between the engine mount bracket support 15, interposed between the front side member 2 and the engine mount bracket 11, and the front side member 2, i.e., the number of spot welding points or the spot welding positions, in suitable configurations, enables the strength and rigidity of the whole of the engine attaching structure to be determined at arbitrarily selected values, resulting in an increase in the freedom of design for the fixing area between the engine attaching portion 6 and the front side member 2 to which consideration should be undertaken not only for its mounting capability of the engine unit 8 but also for the impact energy absorbing efficiency.

Figure 4A:
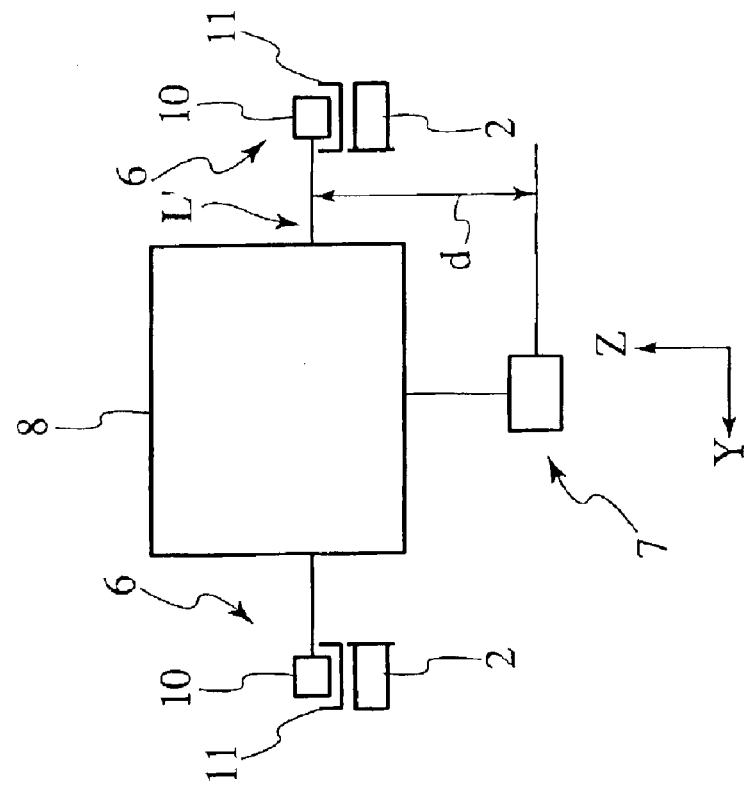
FIG. 4A is a front view illustrative of a configuration of the engine attaching structure of the embodiment.

In addition, firmly securing the engine mount bracket support 15 onto the top surface 2a of the front side member 2 enables, as shown in FIG. 4A, the vehicle body to have a vertical distance "c" between the lower engine attaching portion 7 and the engine mounts 10, 10 of the right and left engine attaching portions 6, 6.

Figure 4B:
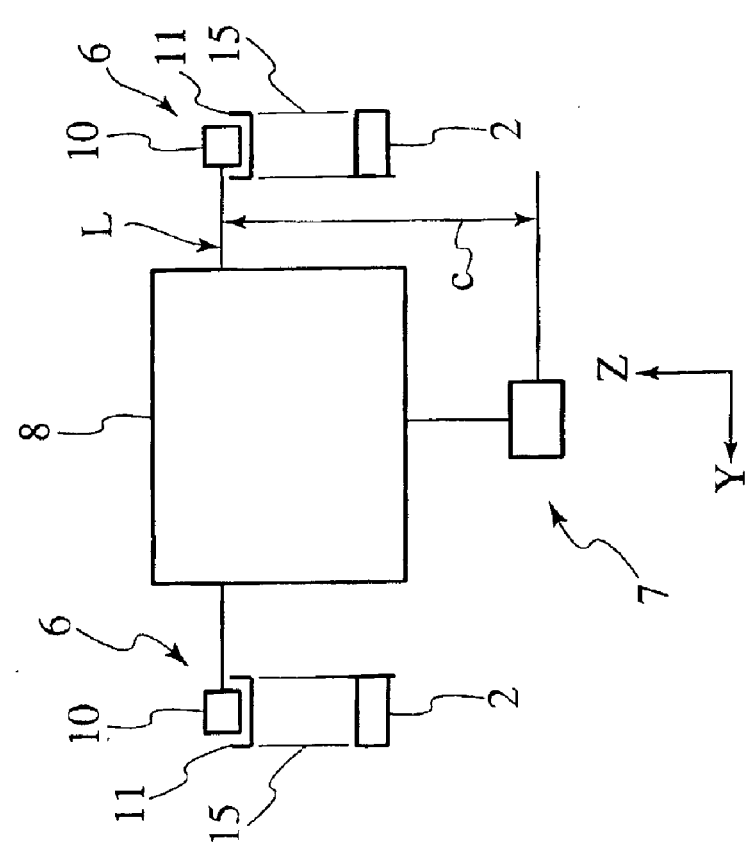
FIG. 4B is a front view illustrative of a configuration of the engine attaching structure of a comparative example.
Figure 5:
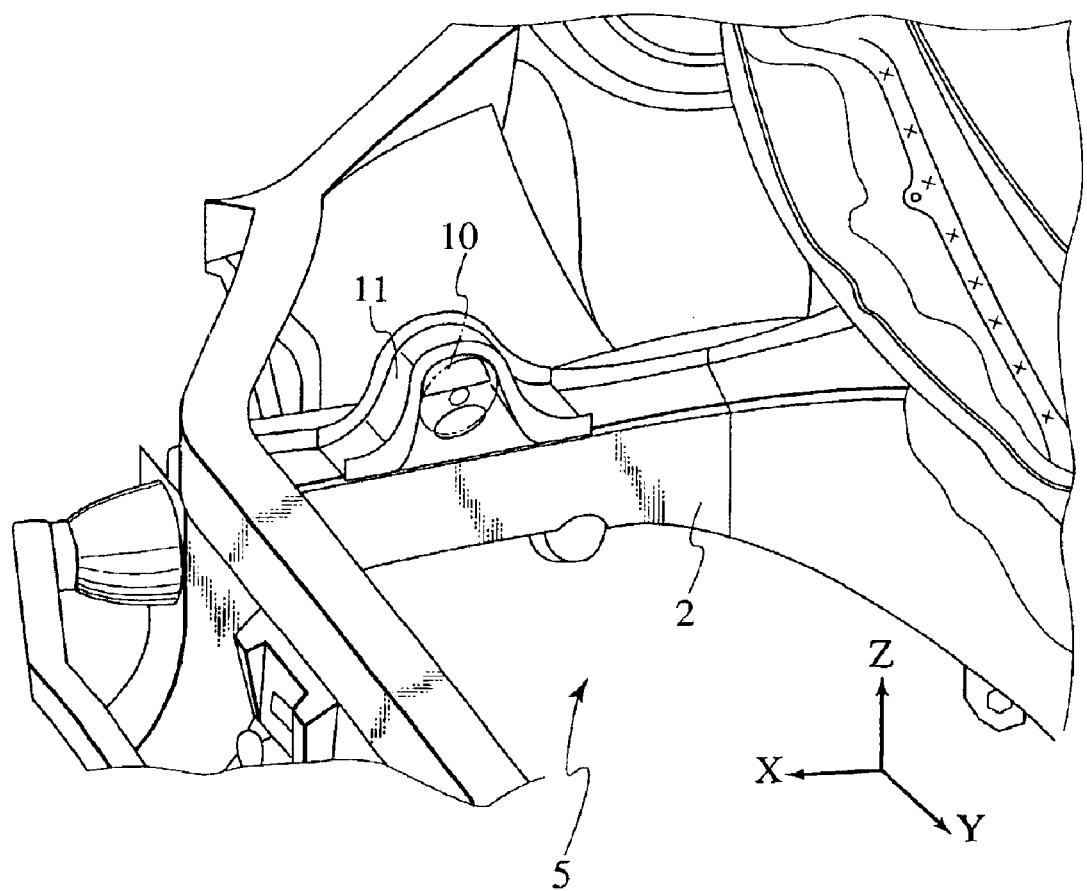
FIG. 5 is a schematic partial perspective view of an engine attaching structure of a related art vehicle body.

Namely, as shown in FIG. 4A, by locating the engine mount bracket support 15 on the top surface 2a of the front side member 2, the vertical distance "c" between the lower engine attaching portion 7 and a line L interconnecting the engine mounts 10, 10 of the right and left engine attaching portions 6, 6 becomes greater than a vertical distance "d" between the lower engine attaching portion 7 and the line L' interconnecting the engine mounts 10, 10 of the right and left engine attaching portions 6, 6 in a comparative structure shown in FIG. 4B.

Consequently, with such a structure, an improved roll strength and roll rigidity of the engine attaching structure is provided, while enabling a reinforcement in the engine attaching portion 6, noise insulation material or sound absorbing material to be disused or minimized.

Further, the structure of the engine mount bracket support 15 formed with the closed fashion in the widthwise direction of the vehicle body enables the shape and size of the closed cross section of the engine mount bracket support 15 to be appropriately modified so as to control the strength and rigidity of the engine mount bracket support 15 per se, providing a capability of further improving the freedom of design at the fixing area of the engine attaching portion 6.

Furthermore, the provision of the strength weakened portion 16 formed in the engine mount bracket support 15 such that the longitudinal strength of the engine mount bracket support 15 becomes lower than that of the engine mount bracket 11 and equal to or less than the longitudinal strength of the front side member 2 leads to an increased selectable range when selecting the strength and rigidity of the front side member 2 and the engine mount bracket support 15, resulting in a further improvement in the freedom of design at the fixing area of the engine attaching portion 6.

Especially, the provision of the strength weakened portion 16 composed of the cutout portion 18 formed in the wall surface 17 forming the closed cross section of the engine mount bracket support 15 enables the strength weakened portion 16 to be formed in a simplified structure that can be fabricated in an easy manner.

The entire content of a Patent Application No. TOKUGAN 2002-014260 with a filing date of Jan. 23, 2002 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An impact absorbing structure for a vehicle body, comprising:

a pair of front side members extending in a longitudinal direction of a vehicle body, at vicinities of both ends of the vehicle body in a widthwise direction of the vehicle body;

an engine room defined between the pair of front side members to allow an engine unit to be located therein; and a pair of engine attaching portions each of which is disposed on corresponding one of the pair of front side members, at an area facing the engine room, each of the pair of engine attaching portions including an engine mount to which the engine unit is connected, an engine mount bracket connected to the engine mount, and an engine mount bracket support intervened between the engine mount bracket and corresponding one of the pair of front side members to support the engine mount bracket, wherein the engine mount bracket support has a strength weakened portion such that a longitudinal strength of the engine mount bracket support is lower than that of the engine mount bracket.

2. The impact absorbing structure according to claim 1, wherein the engine mount bracket support is located on a top surface of the corresponding one of the pair of front side members.

3. The impact absorbing structure according to claim 2, further comprising:

a lower engine attaching portion located downward the pair of engine attaching portions, wherein a distance between the lower engine attaching portion and a line interconnecting engine mounts of the pair of engine attaching portions has an increased value in dependence on the engine mount bracket support.

4. The impact absorbing structure according to claim 1, wherein the engine mount bracket support has an inner vertical wall, disposed inward in the widthwise direction of the vehicle body, and an outer vertical wall, disposed outward in the widthwise direction, such that the engine mount bracket support is closed in the widthwise direction.

5. The impact absorbing structure according to claim 4, wherein the engine mount bracket support further has a top wall connected between the inner vertical wall located inside in the widthwise direction and the outer vertical wall located outward in the widthwise direction to form a substantially hat-shaped cross section that opens downward.

6. The impact absorbing structure according to claim 5, wherein the engine mount bracket support is formed in a closed cross section with a top surface of the corresponding one of the pair of front side members.

7. The impact absorbing structure according to claim 1, wherein the strength weakened portion of the engine mount bracket support includes a cutout portion formed in a wall of the engine mount bracket support.

8. An impact absorbing structure for a vehicle body, comprising:

a pair of front side members extending in a longitudinal direction of a vehicle body, at vicinities of both ends of the vehicle body in a widthwise direction of the vehicle body;

an engine room defined between the pair of front side members to allow an engine unit to be located therein; and a pair of engine attaching means for attaching the engine unit, each of the engine attaching means being disposed on corresponding one of the pair of front side members, at an area facing the engine room, and each of the engine attaching means including mounting means for mounting the engine unit and supporting means for supporting the mounting means, the supporting means being intervened between the mounting means and corresponding one of the pair of front side members, wherein the supporting means has a strength weakened portion such that a longitudinal strength of the supporting means is lower than that of the mounting means.

* * * * *